Figure 1:
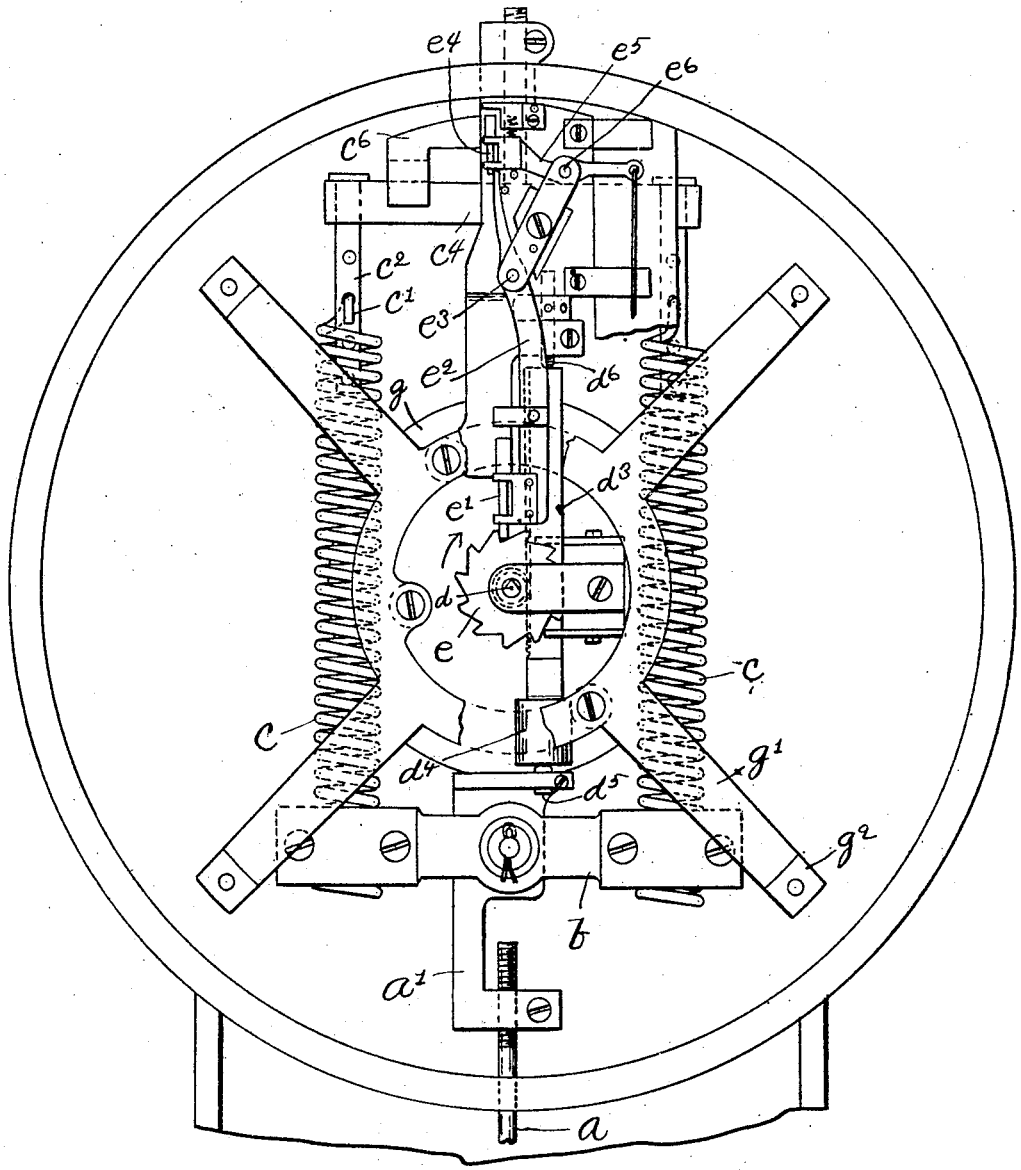

No. 878,915. PATENTED FEB. 11, 1908.
F. VERPLAST.
WEIGHING MACHINE.
APPLICATION FILED JAN. 21, 1907.
2 SHEETS—SHEET 2.
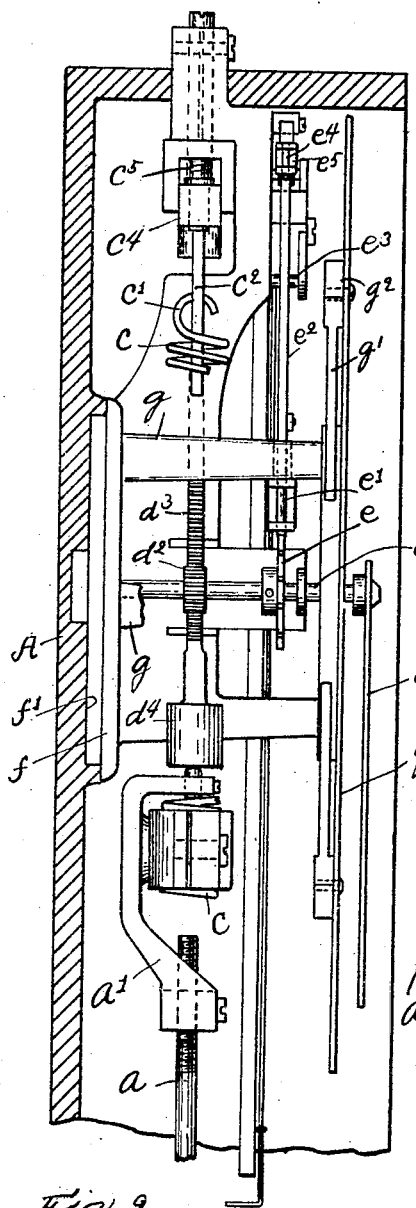
Fig. 2.
Fig. 3.
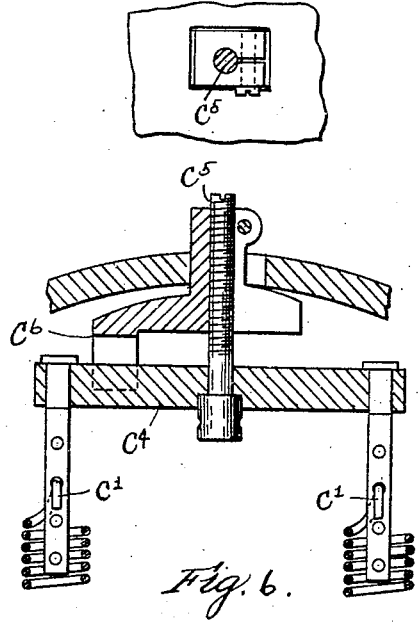
Fig. 7.
Fig. 6.
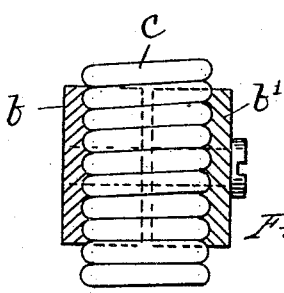
Fig. 5.
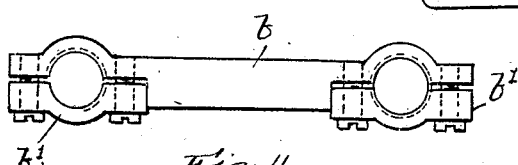
Fig. 4.
Witnesses:
H. B. Davis
Cynthia Doyle
Inventor:
Frederick Verplast
by Nayer & Harriman
Attys.

UNITED STATES PATENT OFFICE.

FREDERICK VERPLAST, OF BOSTON, MASSACHUSETTS.

WEIGHING-MACHINE.

No. 878,915.          Specification of Letters Patent.          Patented Feb. 11, 1908.

Application filed January 21, 1907. Serial No. 353,226.

*To all whom it may concern:*

Be it known that I, FREDERICK VERPLAST, of Boston, county of Suffolk, State of Massachusetts, have invented an Improvement in Weighing-Machines, of which the following description, in connection with the accompanying drawings, is a specification, like characters in the drawings representing like parts.

This invention relates to weighing machines and has for its object to improve the construction of the same in several particulars aiming to increase the reliability of the machine, to insure its positive operation, to decrease the wear and to provide for the removal and replacement of the operating parts in assembled condition, whereby the machine may be taken care of by unskilled persons.

Figure 1 shows in front elevation a portion of a weighing-machine embodying my invention. Fig. 2 is a side elevation of the operating mechanism of the machine showing the case in vertical section. Fig. 3 is a detail showing the means for operating the shaft bearing the indicating-band. Figs. 4, 5 and 6 are details of the means employed for supporting the weighing springs. Fig. 7 is a detail showing the connection of the platform-rod with the supporting-frame.

$a$ represents the platform-rod, which is attached at its lower end to the balancing-levers which support the platform in any usual or suitable manner. The upper end of the rod $a$ is screw-threaded and is thereby adjustably connected to the lower end of a supporting-frame $a'$. A horizontal cross-bar $b$ is pivoted at a point intermediate its length to the supporting-frame $a'$, to which the lower ends of the weighing springs $c, c$ are connected. The opposite ends of the cross-bar $b$ are formed with right angular recesses adapted to receive correspondingly shaped blocks $b'$, see Fig. 5, which are secured thereto by screws or otherwise, and said ends, together with the blocks are formed or provided with spirally threaded holes extending entirely therethrough, to receive the lower ends of the spirally formed weighing-springs $c$. The weighing-springs are held in firm engagement with said cross-bar by tightening the screws which hold the blocks $b'$ in place. The cross-bar, thus constructed, provides for engaging the weighing-springs at any part thereof, thereby providing means for longitudinally adjusting the springs independently of each other. By pivotally connecting the cross-bar $b$ to the supporting-frame $a'$ to which the platform-rod is connected, said bar will serve as an equalizer for the springs when the platform-rod is drawn down.

The upper ends of the weighing-springs are formed with hooks $c'$, which enter any one of a series of holes formed in the shank $c^2$, of headed pins which extend down through holes in the opposite ends of a cross-bar $c^4$, which is supported upon and by a screw $c^5$, which extends up through a threaded hole in the main frame which supports the assembled parts. The headed pins are free to turn in order that the weighing springs may be turned in the threaded holes in the cross-bar, when adjusting them.

The main frame has an ear $c^6$ which extends internally and has a bifurcated end which engages the cross-bar $c^4$, to prevent said bar from turning on the screw $c^5$. By means of the screw $c^5$ the cross-bar $c^4$ may be adjusted to different elevations, to simultaneously adjust the weighing-springs.

$d$ represents the shaft bearing the indicating hand $d'$, which has its bearings in the main frame, and $d^2$ is a pinion on said shaft which is engaged by a rack $d^3$ supported in bearings on the main frame and movable vertically. The rack $d^3$ has at its lower end a weight $d^4$, which, when permitted to act draws down the rack and turns the pinion.

The shaft $d$ has secured to it a toothed wheel $e$, which is engaged and held by a suitable locking-device. The locking-device, herein shown, consists of a vertically sliding pin $e'$, borne by an arm $e^2$, pivoted at $e^3$ to the main frame. The upper end of said arm is engaged by a vertically sliding pin $e^4$, supported by one end of a lever $e^5$, which is pivoted at $e^6$, the opposite end of said lever having connected with it the means for operating it. When the lever $e^5$ is operated the locking-device disengages the toothed wheel $e$, and the pinion is thereby permitted to revolve.

The weighted rack normally rests upon an anvil $d^5$, held by the supporting-frame $a'$, and when said frame is drawn down by the platform-rod said anvil is removed from beneath the weighted-rack. The supporting-frame and anvil are adjusted so that the anvil just engages the weighted rack when the locking-pin engages the toothed wheel on the shaft $d$, hence the weighted rack is supported by said anvil yet is held in elevated position by said toothed wheel when the anvil is removed from beneath it, and until such time as said toothed wheel is released. Therefore a person mounting the platform will cause the supporting-frame to descend but the weighted rack will not fall until the operating-lever of the locking-device has been operated. When a person steps from the platform the supporting frame is raised and the weighted rack likewise raised, and to limit the quick upward movement of the rack an adjusting screw $d^6$ is provided, which is supported by the main frame. The rack on returning will pass by its normal position of rest and will strike said adjusting-screw, after which it falls slightly and comes to rest on the anvil with the locking-pin in engagement with the toothed wheel $e$.

The main-frame bearing all the assembled parts is formed or provided with a circular base $f$, adapted to fit a circular seat $f'$, which is formed or provided on the interior of the rear wall of the case A, and said frame is removably connected with said rear wall by screws or otherwise.

The circular base and the circular seat are made concentric to the shaft bearing the indicating-hand, so that when the frame is placed in position all the parts will occupy their proper and correct relative positions, therefore requiring no further adjustment.

The main frame, constructed in this manner and bearing all the parts in assembled condition, so that it may be easily removed and replaced by unskilled persons, forms an important feature of my present invention.

The main frame has secured to or formed integral with it several posts $g$, which extend forward, and against the ends of these posts a frame-plate $g'$ is secured, comprising several radially extended arms, the extremities of which are formed with bosses $g^2$, and the dial-plate $g^3$ is placed upon said bosses and is secured thereto by screws or otherwise. By forming the support for the dial-plate rigidly with the main frame which supports the assembled parts, it will be correctly localized with respect to the indicating-hand, whereas in previous constructions, so far as I am aware, said plate has been supported by means independent of the frame bearing the indicating-hand and much difficulty has been experienced in adjusting it.

Having thus described my invention, what I claim as new and desire to secure by Letters Patent is:—

1. In a weighing machine, the combination of a spirally formed weighing-spring, means for supporting its upper end, a bar having a divided end formed with a spirally threaded hole through it for engaging the lower end portion of said spring at any part thereof and means for adjusting one part of said divided end with relation to the other to firmly engage or to release the spring and a platform-rod connected with said bar, substantially as described.

2. In a weighing machine, a pair of weighing-springs, a pair of hooks at their upper ends, a cross-bar having rotatable pins projecting through it provided each with a series of holes adapted to receive said hooks and means for supporting said cross-bar, substantially as described.

3. In a weighing machine, a pair of weighing-springs, a cross-bar to which the upper ends of said springs are connected, a headed screw on which said cross-bar is swiveled a removable frame bearing said screw adapted to be attached to the case and indicating mechanism supported by said frame, substantially as described.

4. In a weighing machine, the combination of a shaft bearing an indicating hand, a pinion thereon, a weighted rack engaging said pinion, an adjusting-screw against which the upper end of said rack strikes, which limits its upward movement, and an anvil borne by means to which the weighing-springs and platform-rod are connected upon which the weighted rack normally rests, substantially as described.

5. In a weighing machine, a main frame supporting the shaft bearing the indicating-hand and also the means for operating said shaft, having a frame-plate secured to it comprising a plurality of radially extended arms formed with bosses at their extremities and a dial-plate attached thereto, substantially as described.

In testimony whereof, I have signed my name to this specification, in the presence of two subscribing witnesses.

FREDERICK VERPLAST.

Witnesses:
B. J. NOYES,
H. B. DAVIS.